(12) United States Patent
Gruchala et al.

(10) Patent No.: US 7,257,209 B2
(45) Date of Patent: Aug. 14, 2007

(54) CALLING-PARTY-PAYS CALL PROCESSING FOR CELLULAR AND PAGING

(75) Inventors: Carol Shifrin Gruchala, Naperville, IL (US); Gordon Lynn Blumenschein, Woodridge, IL (US); Douglas Marshall, Round Lake, IL (US); Roger Albert Sosa, Highland Park, IL (US); Carlos Donoso, Bartlett, IL (US)

(73) Assignee: SBC Properties, L.P., Austin, TX (US)

( * ) Notice: Subject to any disclaimer, the term of this patent is extended or adjusted under 35 U.S.C. 154(b) by 741 days.

(21) Appl. No.: 10/407,154

(22) Filed: Apr. 2, 2003

(65) Prior Publication Data
US 2003/0220098 A1    Nov. 27, 2003

Related U.S. Application Data

(63) Continuation of application No. 09/861,460, filed on May 18, 2001, now Pat. No. 6,570,970, which is a continuation of application No. 09/061,514, filed on Apr. 16, 1998, now Pat. No. 6,263,056.

(51) Int. Cl.
*H04M 15/00* (2006.01)
(52) U.S. Cl. .............. 379/127.01; 379/114.01; 379/114.03; 379/114.21; 379/118; 379/127.05; 455/405; 455/406
(58) Field of Classification Search .......... 379/112.01, 379/114.01, 114.03, 114.05, 114.21, 114.28, 379/118, 127.01, 127.03, 127.05, 127.06, 379/133; 455/405, 406, 407, 408
See application file for complete search history.

(56) References Cited

U.S. PATENT DOCUMENTS

| | | | |
|---|---|---|---|
| 4,935,956 A | 6/1990 | Hellwarth et al. | |
| 5,027,387 A | 6/1991 | Moll | |
| 5,146,491 A | 9/1992 | Silver et al. | |
| 5,465,293 A | 11/1995 | Chiller et al. | |
| 5,465,295 A | 11/1995 | Furman | |
| 5,473,667 A | 12/1995 | Neustein | |
| 5,473,671 A | 12/1995 | Partridge, III | |
| 5,511,111 A | 4/1996 | Serbetcioglu et al. | |
| 5,537,464 A | 7/1996 | Lewis et al. | |
| 5,557,664 A | 9/1996 | Burns et al. | |
| 5,574,776 A | 11/1996 | Leuca et al. | |
| 5,579,379 A | 11/1996 | D'Amico et al. | |
| 5,636,269 A | 6/1997 | Eisdofer | |
| 5,657,375 A | 8/1997 | Connolly et al. | |
| 5,666,405 A | 9/1997 | Weber | |
| 5,675,635 A | 10/1997 | Voc et al. | |
| 5,722,067 A | 2/1998 | Fougnies et al. | |
| 5,737,688 A | 4/1998 | Sakai et al. | |

(Continued)

*Primary Examiner*—Quoc Tran
(74) *Attorney, Agent, or Firm*—Brinks Hofer Gilson & Lione

(57) ABSTRACT

An enhanced Calling Party Pays (CPP) or Paging Party Pays (PPP) system that enables 1) billing of calls originating from traditionally non-billable sources, 2) routing of incoming calls to voicemail if the caller does not wish to incur the additional charges, 3) allowing the caller to complete the call and charge the cellular (or paging) subscriber for additional air-time usage when the caller enters a PIN or security code, also referred to as a billing override code, and 4) allowing the caller to block CPP/PPP charges from being billed to the calling party

18 Claims, 8 Drawing Sheets

U.S. PATENT DOCUMENTS

| | | |
|---|---|---|
| 5,835,573 A | 11/1998 | Dee et al. |
| 5,920,815 A | 7/1999 | Akhavan |
| 5,963,625 A | 10/1999 | Kawecki et al. |
| 6,169,891 B1 | 1/2001 | Gorham et al. |
| 6,188,751 B1 | 2/2001 | Scherer |
| 6,263,056 B1 | 7/2001 | Gruchala et al. |
| 6,298,126 B1 | 10/2001 | Kawecki et al. |
| 6,327,357 B1 | 12/2001 | Meek et al. |
| 6,373,931 B1 * | 4/2002 | Amin et al. ............ 379/121.01 |
| 6,570,970 B2 * | 5/2003 | Gruchala et al. ...... 379/127.01 |

* cited by examiner

Prior Art AIN

Prior Art CPP AIN

CALLING-PARTY-PAYS CALL PROCESSING FOR CELLULAR AND PAGING

This application is a continuation of U.S. application Ser. No. 09/861,460 filed May 18, 2001 now U.S. Pat. No. 6,570,970, which is a continuation of U.S. application Ser. No. 09/061,514 filed Apr. 16, 1998 (now U.S. Pat. No. 6,263,056), each of which is hereby incorporated by reference herein.

BACKGROUND OF THE INVENTION

A. Field of the Invention

The present invention relates to a method of processing telephone calls where the called party is a cellular subscriber or a paging system subscriber. More particularly, the invention relates to methods of call processing to provide enhanced billing, routing, and messaging services.

B. Description of the Related Art

Cellular system subscribers typically are charged a fee for use of the cellular system, regardless of whether the cellular subscriber initiates or receives the call. Similarly, paging system subscribers are charged a fee for paging calls received. Subscribers may not have control over who calls (or pages) them, other than to keep their phone number out of the public domain. However, maintaining an unlisted number has disadvantages, and may not be practical for a business setting. Consequently, systems that require the calling party to pay, known as Calling Party Pays (CPP) and Paging Party Pays (PPP) systems, have been implemented to charge a calling party for the entire call rather than to charge the cellular/paging subscriber for calls incoming to the subscriber. That is, with CPP/PPP services, the land-line user calling a cellular or paging user will pay the land-line usage as well as the air time charges associated with the call.

After an end-user dials the cellular/paging subscriber's telephone number, the end-user is prompted with an announcement indicating they will be billed for the call. At such time, the end-user has the option of continuing the call and being billed for the call, or hanging up if they do not want to incur the charges.

The prior art systems have limited features, and are unable to charge the calling party under certain circumstances, such as when calls are initiated from payphones, hotels, etc. These are commonly referred to as "leakage calls" originating from "leakage sources."

1. The Digital Phone Network

FIG. 1 depicts a typical prior art Advanced Intelligent Network (AIN) used for call processing and routing. A calling party using telephone subscriber unit 10 conveys dialing information to its End Office 20 (EO), also known as a Service Switching Point (SSP) 20. The SSP 20 routes the call to the called party's SSP 30 that routes the call to the called party's telephone subscriber unit 40. The calling party's SSP 20 obtains the necessary information used to route the call to SSP 30 via a Signaling System 7 network (SS7), which includes a Signaling Transfer Point 50 (STP) and a Service Control Point 60 (SCP). Typically, the SCP 60 has access to an External Data Base 70 (EDB) containing various network and subscriber data. As is well known in the art, the SS7 Network is hierarchical, with the STP 50 having a routing function to direct SS7 communications to the appropriate SCP 60.

In the AIN network, call routing is performed using SS7. As is well known in the art, SS7 is generally made up of i) transport protocols known as Message Transfer Parts 1-3 (MTP) and the Signaling Connection Control Part (SCCP), and ii) user parts such as Transaction Capabilities Application Part (TCAP), Telephone User Part (TUP), and ISDN User Part (ISUP), which use the lower level MTP and SCCP capabilities. TCAP provides a way for an application at one node in the network to access a database at another node or to invoke the execution of a procedure at another node. Further information about SS7 may be found in T. Russell, "Signaling System #7,"McGraw Hill (1995), the teachings of which are incorporated herein by reference.

Routing within an AIN network is performed based on dialed digits in the form of area code, exchange prefix, and line number, NPA-NXX-XXXX. The area code is referred to as a Numbered Plan Area (NPA) and the exchange prefix is referred to as NXX. The subscriber line number XXXX are digits seven through ten. Alternatively, the numbering format is often given as NXX-NXX-XXXX, where N can be any number 2-9, and X can be any number 0-9. Throughout this specification NPA-NXX will be used to refer to the area code and exchange prefix of a phone number.

In the AIN network the EO is typically a class 5 switch. The tandem switch is of class 4, meaning that switching is performed between two trunk lines and subscribers are typically not serviced directly. In the AIN network, cellular and paging service switches are typically connected to a tandem switch. The NXX numbers assigned to the cellular providers are associated, or "homed," to the class 4 tandem switches. The class-5 SSPs are configured to route cellular and paging calls directly to the tandem.

2. Calling Party Pays

In prior art CPP systems (FIG. 2), SSP 20 routes cellular (or paging) calls from the calling subscriber unit 10 to the Tandem 80 based on the dialed NPA-NXX information. Based on the called party number, tandem 80 launches a TCAP query to the SCP 60 to determine if the particular cellular or paging provider offers CPP services. In addition, the tandem queries SCP 60 using the calling party's Automatic Numbering Identifier (ANI) to determine the billable status of the calling number based on its Charge Party Station Type (CPST).

The CPST is also referred to as "ANI II." Some standard ANI II Codes are given: ANI II Code 00 is used to designate standard billable calls with no special attributes; ANI II Code 27 identifies a line connected to a pay station which uses network provided coin control signaling; ANI II Code 29 is used to identify lines serving a confinement or detention facility that are intended for inmate/detainee use and require outward call screening (e.g., 0+collect only service); ANI II Code 70 identifies a line connected to a pay station (including both coin and coinless stations) which does not use network-provided coin control signaling.

If the SCP 60 determines that the called subscriber does not have a CPP option, the SCP 60 instructs the tandem to route the call as normal to the Mobile Telephone Switching Office 90 (MTSO) for transmission to the subscriber unit 100. If, on the other hand, the SCP 60 determines that the cellular subscriber 100 (called party) has a CPP option, and the calling subscriber unit 100 is of billable status, the SCP 60 instructs the tandem 80 to route the call to the MTSO 90 and to create a billing record in an Automatic Message Accounting (AMA) data base 110 to record the charge to the calling party for the air-time associated with the call. If the SCP 60 determines that the calling subscriber 100 is not of billable status, then the SCP 60 nevertheless instructs the tandem 80 to route the call to the MTSO 90. The tandem 80 regards the call as leakage and may route the non-billable call to the MTSO 90 over a separate pre-designated trunk 120, wherein the use of that trunk indicates that the call has not been billed to the calling party. The cellular provider may then treat the call as "leakage" and not bill it, or the provider can charge the cellular subscriber for the air-time.

SUMMARY OF THE INVENTION

The process described herein allows a cellular or paging system to provide enhanced Calling Party Pays (CPP) or Paging Party Pays (PPP). The enhancements enable the system to 1) bill calls originating from traditionally non-billable sources, 2) route incoming calls to voicemail if the caller does not wish to incur the additional charges, 3) allow the caller to complete the call and charge the cellular (or paging) subscriber for additional air-time usage when the caller enters a PIN or security code, also referred to herein as a billing override code, and 4) allow the caller to block CPP/PPP charges from being billed to the calling party.

An object of the method described herein is to allow the cellular or paging service provider to recover the costs of calls originating from leakage sources by routing leakage calls to a billing service, such as a credit card billing service. The method involves the steps of receiving information containing a calling number and a called number; determining the billing status of the calling subscriber device in response to the received calling number; determining the billing preferences of the called subscriber device in response to the received called number; and, routing the call to a billing service provider if the billing status is determined to be billable and the billing preferences are calling party pays, thereby allowing the billing service provider to obtain billing information about the calling subscriber device. The method preferably involves examining a database field containing the Charge Party Station Type of the first subscriber device, and/or examining a database field containing billing preferences of the second subscriber device. The method steps are preferably performed at a service control point of an advanced intelligent network, but may be performed on a distributed basis within a network. Preferably, the called and calling service control point recognizes calls returned from the billing service provider by examining the AIN of the incoming call, which is a ten digit predetermined pseudo-code indicative of a successfully billed call. This method is particularly advantageous in that it does not require the SCP to perform billing operations. The SCP advantageously does not have to access directly an outside billing service provider or maintain large databases containing billing information.

An object of the method described herein is to allow the cellular or paging service provider to route calls to a voice mail service if the calling party does not wish to incur additional charges for the completion of the call. The method involves playing a message to the calling party and checking for a one digit response indicating they have selected the voice mail option. The call is then routed to the MTSO voice mail system.

It is a further object of the method described herein to allow the caller to complete the call where the called party is billed for air-time charges by entering a PIN, or a calling party pays billing override code. The method of processing the call preferably involves the steps of receiving information containing a called number corresponding to the second subscriber device; determining the billing preferences of the second subscriber device in response to the received called number; receiving and verifying a calling party pays override code; and routing the call to the second subscriber device without charging additional fees to the calling party.

It is also an object of the method described herein to allow the caller to block CPP/PPP services from their phone, thereby preventing CPP/PPP calls from being charged to their account. Preferably, the value of the Charge Party Station Type (CPST) associated with the calling number is modified within the SCP data base to reflect CPP blocking, PPP blocking, or both, by the addition of a one-digit CPST prefix.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
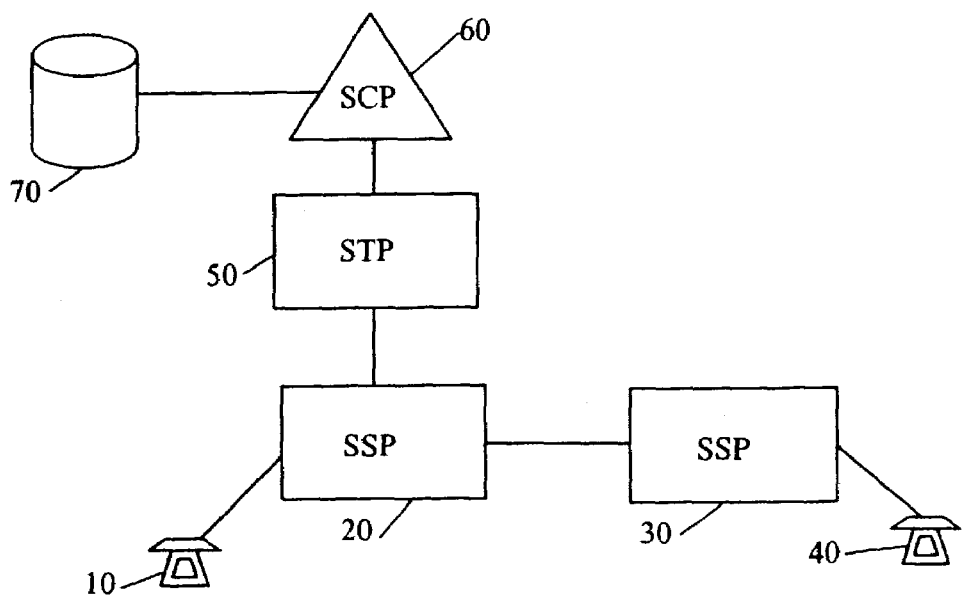
FIG. 1 depicts a prior art advanced intelligent network.
Figure 2:
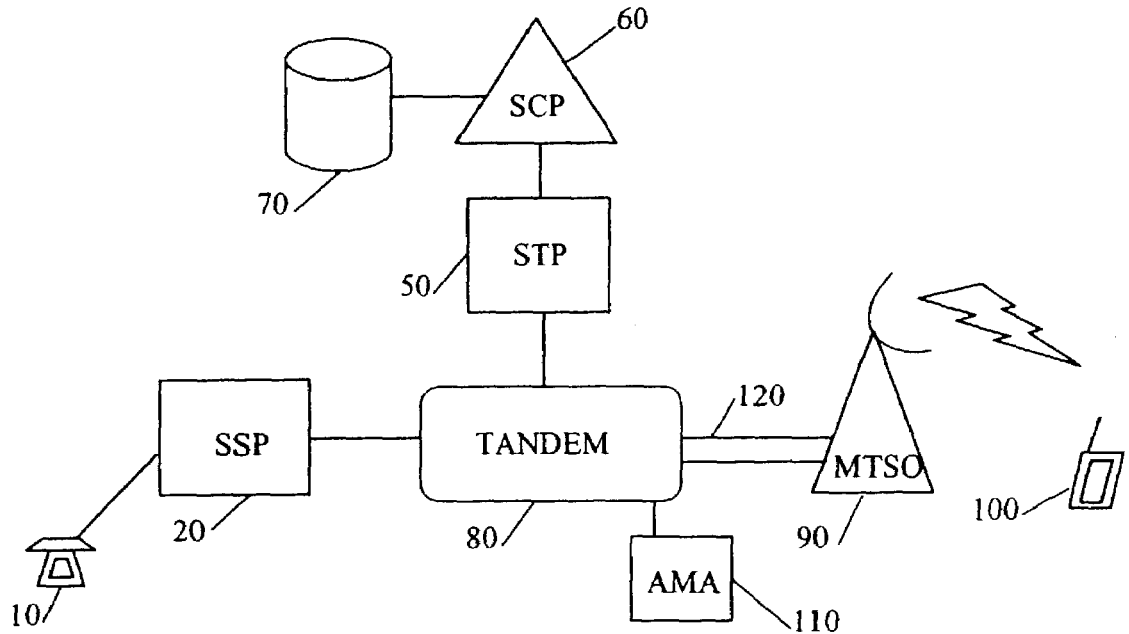
FIG. 2 depicts a prior art calling party pays advanced intelligent network; and, FIGS. 3-9 show flow charts of the call processing of the preferred embodiment of the improved calling party pays service.

The preferred methods of enhanced Calling Party Pays and Paging Party Pays (CPP/PPP) are intended for use with cellular voice and/or data systems and paging systems. References herein to "cellular" subscribers and systems are also intended to include paging subscribers and systems. Similarly, references to calling and called parties generally apply to cellular as well as paging calling and called parties. Where significant differences exist between enhanced CPP cellular and PPP paging systems, they will be specifically mentioned.

The preferred methods of enhanced calling party pays operate on the existing digital telephone network infrastructure. However, many devices, particularly the Service Control Point, have been altered in order to perform the methods described herein.

The tandem switch preferably launches a TCAP query to its designated SCP, via its designated STP. The TCAP query is launched based on a standard 3/6/10 trigger. The 3/6/10 trigger is a mechanism that tests the 3 digits, 6 digits, or 10 digits, to determine if the called number meets certain criteria. This triggering mechanism is also referred to as a Specific Digit String (SDS) when the trigger is not specifically limited to a three, six or ten digit string. The trigger may also be, e.g., seven, eight, or nine digits as well. The preferred criteria typically consist of the NPA-NXX of the MTSOs connected to the tandem. The trigger may be configured for seven, eight, nine, or ten digits if a particular NXX has been subdivided among a plurality of MTSOs.

The TCAP query includes the phone number dialed and the calling number, if available. The SCP performs a check to see if the call is directed to a CPP/PPP number. If it is so directed, the SCP determines the cellular provider for the called subscriber device and the options associated with that provider.

The SCP determines whether it has information records associated with the calling party based on the calling party's AIN. If the SCP does have detailed information records, the SCP determines whether the calling party has blocked CPP or PPP or both, and then determines the billability of the calling party based on the ANI II (CPST). The CPST contains both the billable status information and the blocking status information, and is stored in an external database.

If the number is not billable, or if the SCP does not have a record of the calling number, or if the calling number is not available, the SCP determines whether the called cellular provider has credit card billing or voice mail options enabled. If the provider does have at least one of these options, the tandem is instructed to play the appropriate message determined by the options selected by the provider. If voice mail and credit card billing is available, the tandem plays a message prompting the calling party to indicate whether they would like to be connected to voicemail, or in the alternative, whether the call should be forwarded to a credit card billing service, or billing service provider, to collect billing information from the calling subscriber.

If the SCP determines that the calling number is not CPP blocked and is billable from the CPST, the SCP then instructs the calling party, via the tandem, to make a selection. The selection may indicate that the calling party wishes to use a personal identification number (PIN) to override the CPP/PPP billing feature, whereupon the calling party is prompted for the entry of the PIN. If the PIN is valid, the call is not billed to the calling party and the call is routed. The selection may indicate that the calling party is willing to accept the charges, whereupon the calling party is billed and the call is routed.

Figure 3:
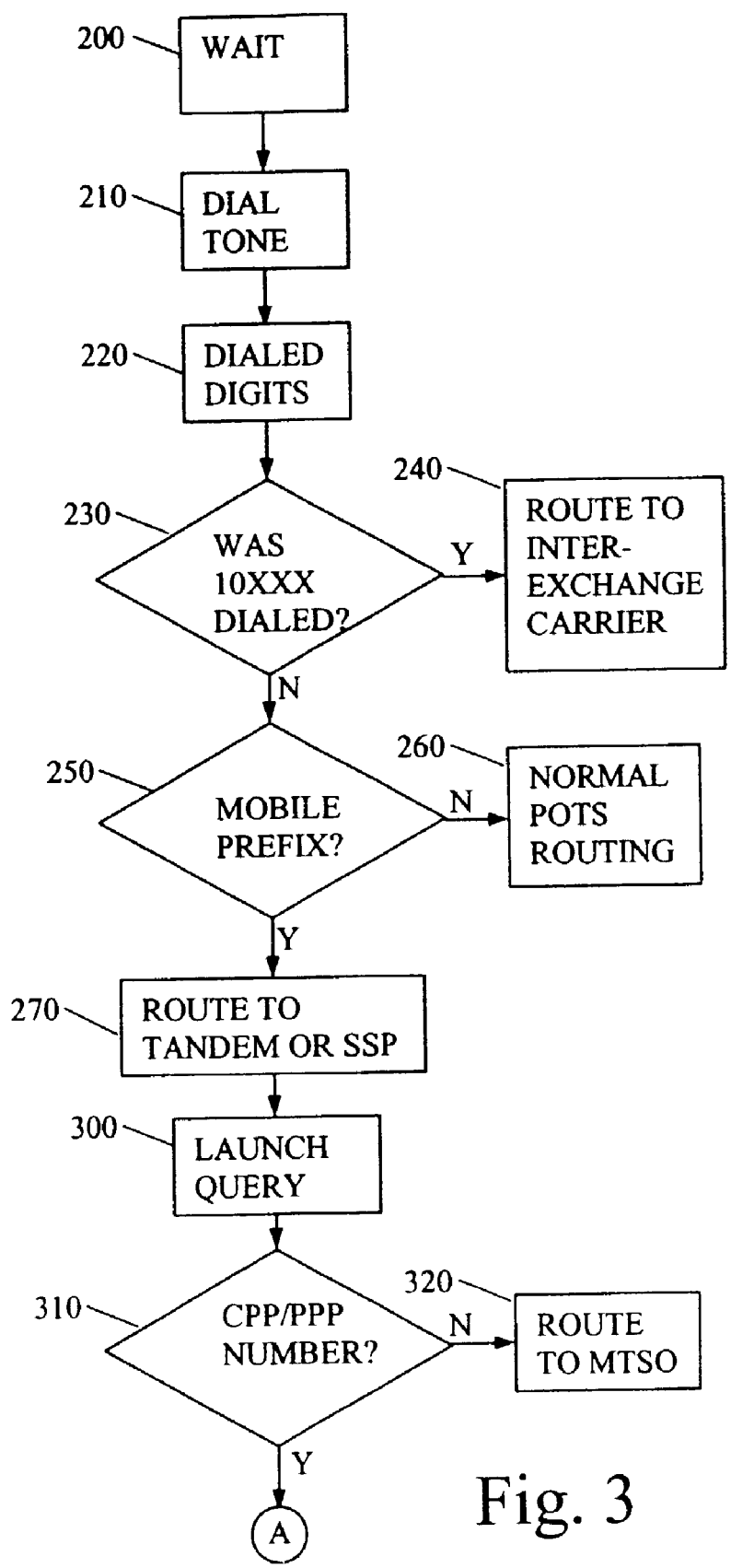

With reference to FIG. 3, at step 200 the SSP waits for an off-hook condition from the subscriber and provides dial tone at step 210 in response to the off-hook indication. At step 220 the SSP collects the dialed digits and checks to see if 10XXX service was dialed in step 230. If so, the SSP routes the call to the appropriate inter-exchange carrier at step 240. If not, the SSP determines at step 250 whether a mobile prefix was dialed. The SSP follows normal plain ordinary telephone service (POTS) routing at step 260 if the prefix was not for a mobile or paging device. The originating end office (EO) must recognize if a mobile or paging exchange was dialed. When a mobile number is called, the SSP/EO routes the call to the appropriate tandem or SSP at step 270. In the preferred embodiment, the MTSOs are connected to other switches in a tandem configuration. These tandem switches typically do not service any subscriber loops. In the event that the tandem also provides subscriber loops, they may also be referred to as SSPs.

The tandem switch launches a TCAP query at step 300 upon detection of a predetermined 3/6/10 trigger condition, or SDS trigger. The trigger criterion is preferably in accordance with TR 1284/1298 and TR 1285/1299. A six-digit trigger is preferably used, triggering all of the cellular and paging calls. Alternatively, a trigger of 7, 8, or 9 digits may be used to conserve the number of non-CPP calls accessing the SCP. In the case of Type 1 traffic, the trigger may be on a seven or eight digit basis. Since existing prefixes are used, each prefix will need to be provisioned in the STP to route via Global Title Translations to the appropriate SCP.

The TCAP query is referred to as an Info_Analyzed message which includes among other parameters the CallingPartyNumber (CPN), RedirectingInformation, RedirectionCalledPartyID, and OriginalCalledPartyID. The SCP will also note the Originating Point Code to identify the originating office. The query is sent using the SS7 protocols to the appropriate SCP via an STP. Initially, at step 310, the SCP screens the called number to determine if the cellular subscriber subscribes to the CPP service. Based on the screening, the SCP will return a Continue response to the tandem at step 320 if the cellular number is not a CPP subscriber.

Figure 4:
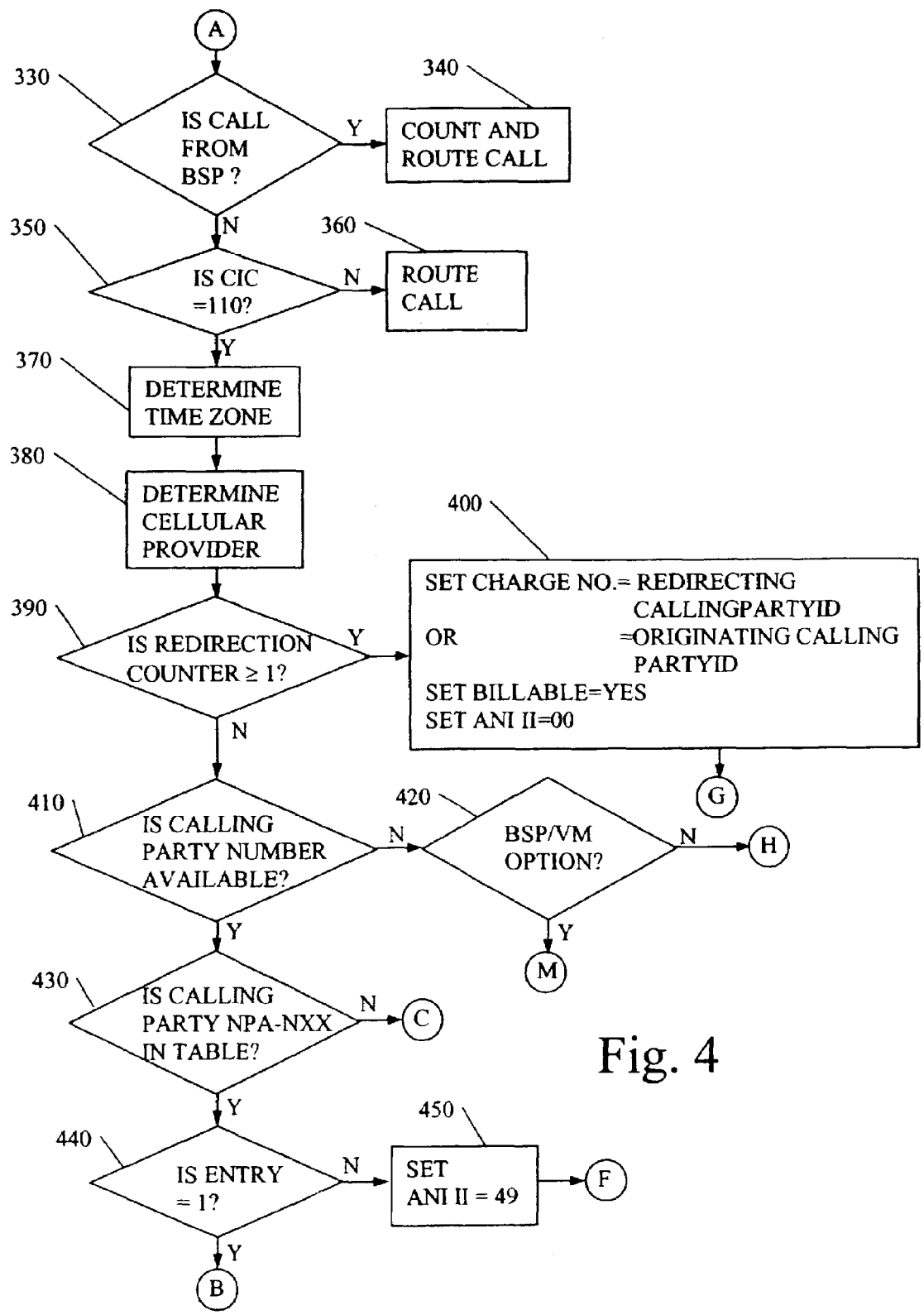

With reference to FIG. 4, the SCP then checks at step 330 to see if the call is one that is being returned from a Billing Service Provider (BSP), thereby indicating that the call has been processed for billing and should be routed as indicated at step 340. When the BSP returns the call, it is routed to the tandem based on the called number (the cellular or paging subscriber number). The tandem launches a TCAP query, as stated above. The SCP determines that call is incoming from the BSP by examining a pseudo-code inserted into the CPN field by the BSP. The pseudo-code is an arbitrary predetermined code that allows the SCP to identify that the call is not an originating call, but that the call is being returned from the BSP after collection of billing information. The pseudo-code is not an otherwise valid NPA-NXX-XXXX number.

If it is not a BSP call, then the SCP double checks the CIC at step 350 to ensure the call is intended for the telephone carrier with which the SCP is associated. If not, the call is routed according to the CIC at step 360. If it is intended for the carrier, the SCP then determines the time zone and cellular/paging provider at steps 370 and 380.

The SCP also checks the redirection counter at step 390. If the call has been redirected the redirecting party preferably is billed. Alternatively, the calling party may be billed, as indicated at step 400. Thus, if the redirection counter is one the OriginalCalledPartyID should be used, if the Redirection counter is greater than one then the RedirectingPartyID should be used. The call is further processed according to the steps depicted in FIG. 8.

Figure 6:
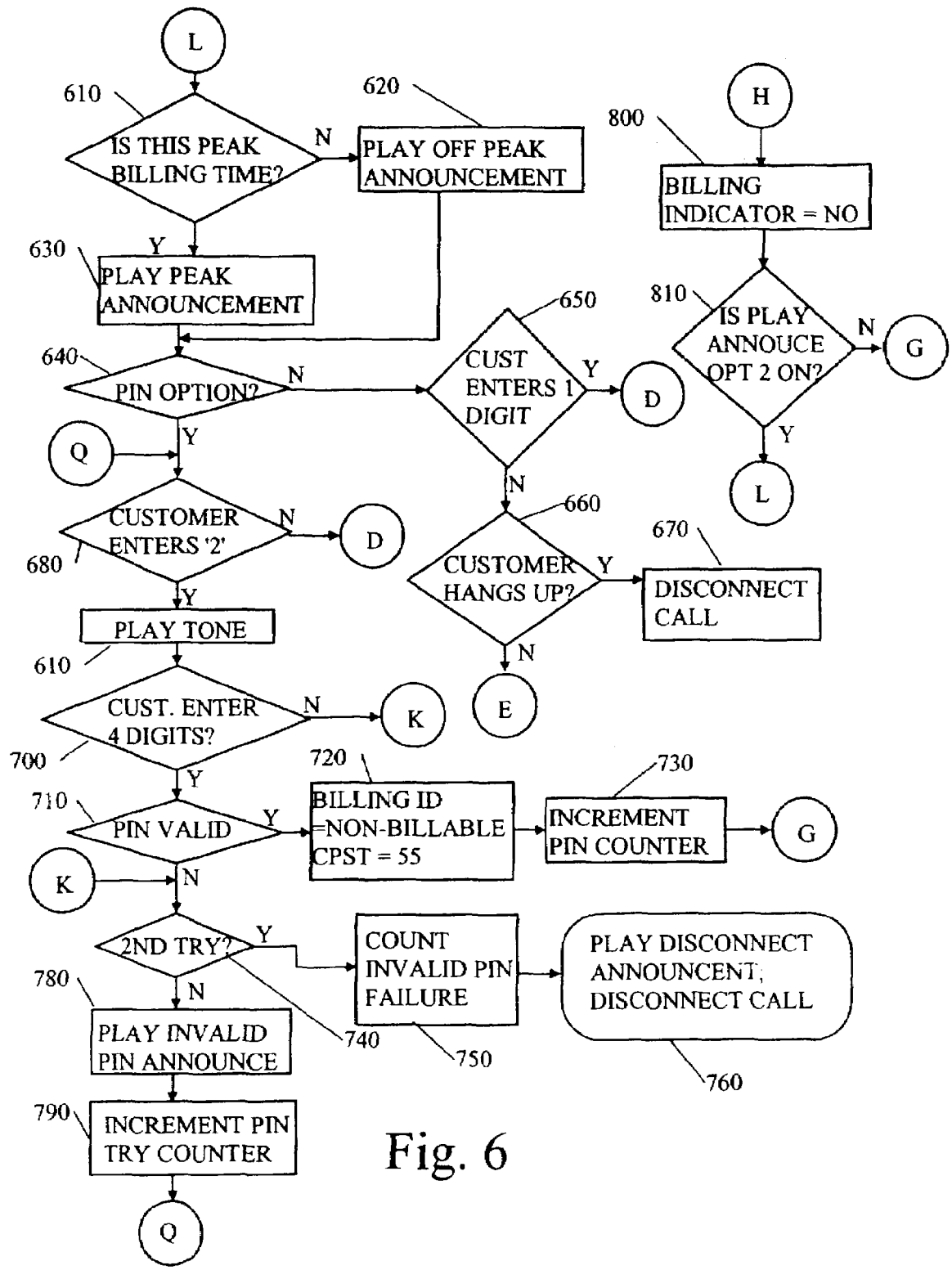

If the call has not been redirected, the SCP determines at step 410 if the CPN is available, and if not, the SCP determines whether the provider has a BSP or voice mail (VM) option at step 420. If the option is available, the SCP processes the call in accordance with the flow chart depicted in FIG. 9, discussed below. If the provider does not have a BSP/VM option, the call is processed according to the flow chart depicted in FIG. 6, steps 800 and 810, which set the billable status to 'no' and checks the Play Announcement Option. If, however, the CPN is available, the SCP checks at step 430 to see if the CPN is in its table. An entry of 2 in the table indicates that the calling party is not a customer of the system associated with the SCP, in which case the ANI II is set to 49 at step 450, and the call is processed in accordance with steps depicted in FIG. 6.

Figure 5:
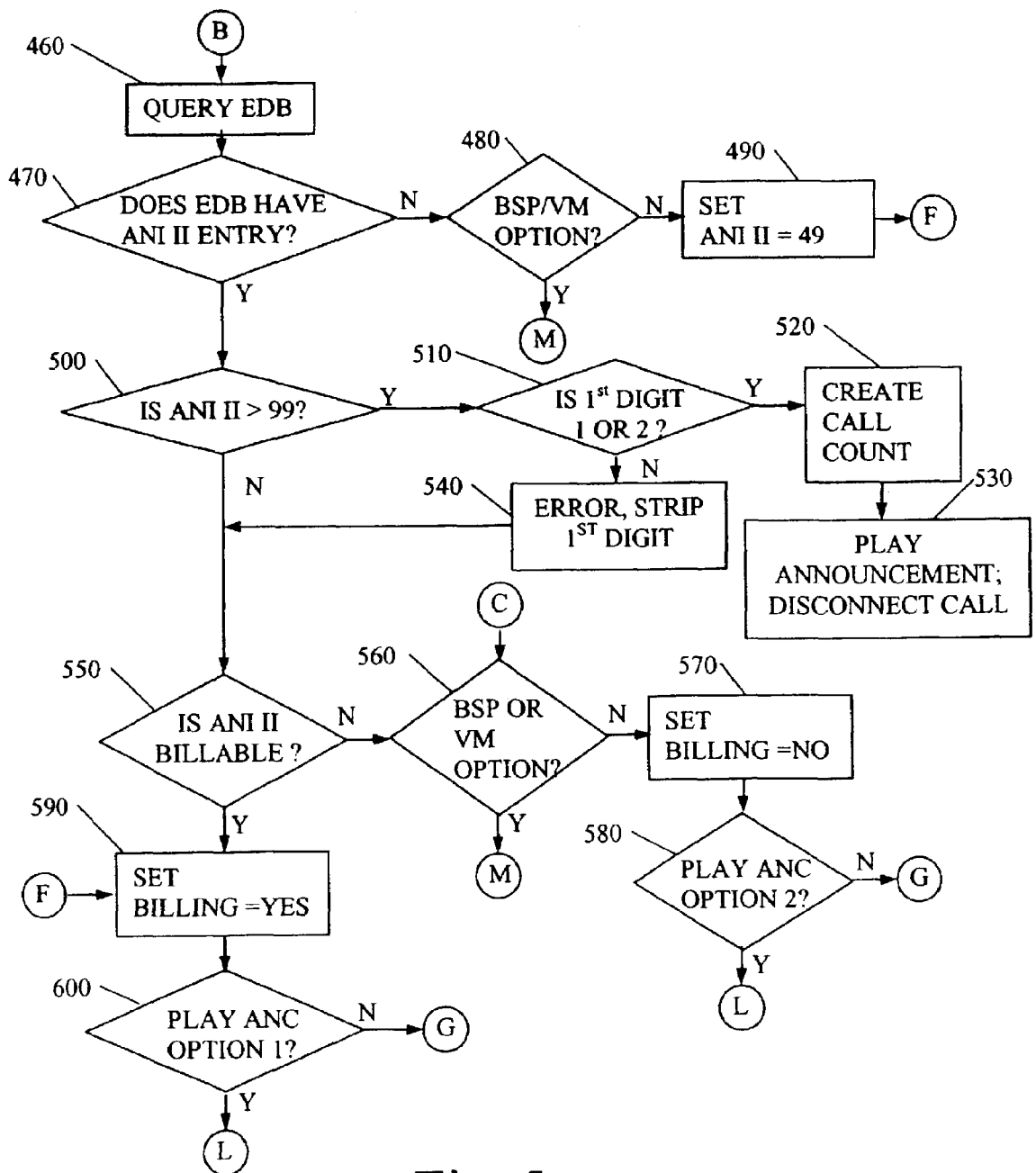
Figure 9:
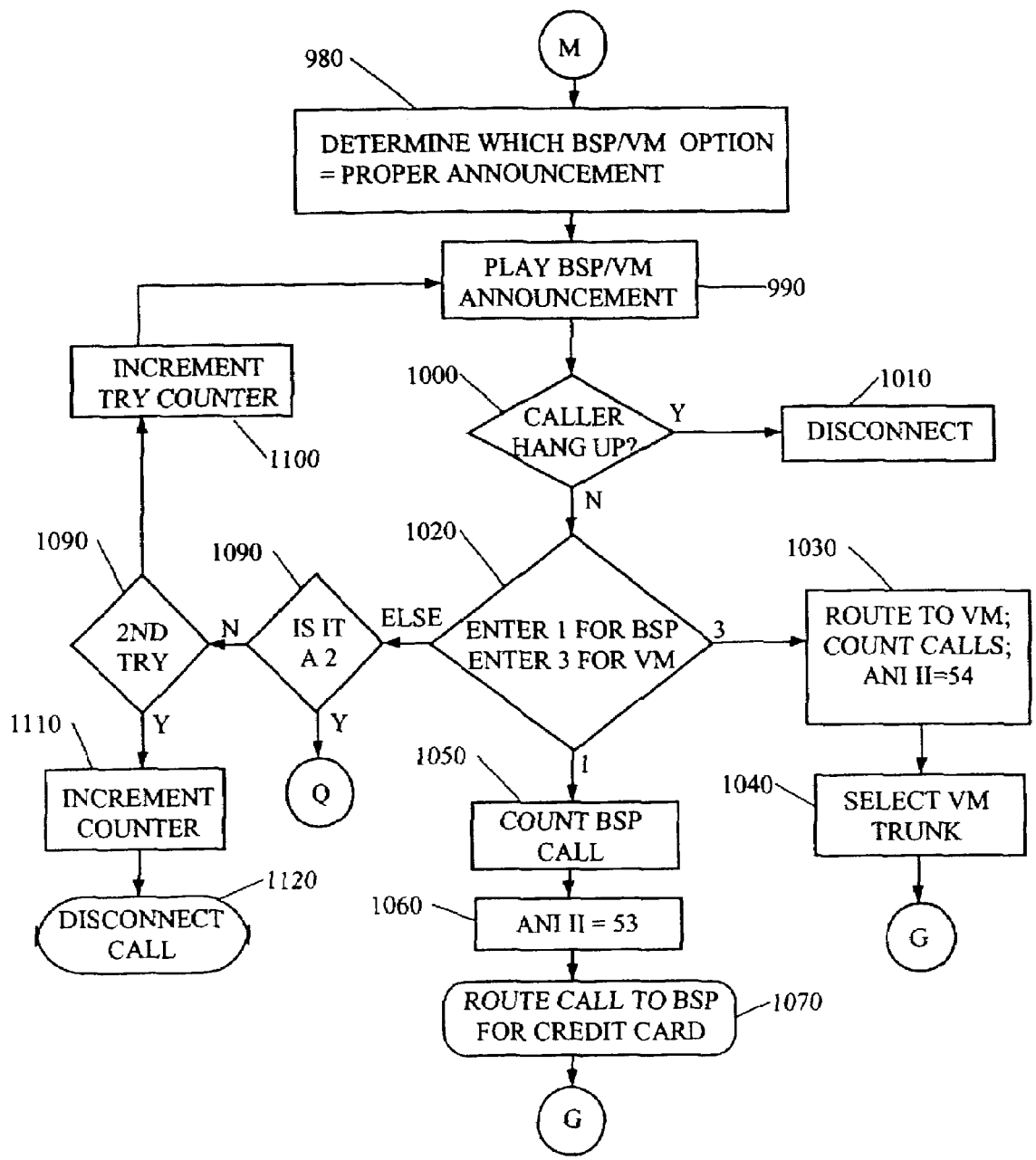

An entry of 1 in the table at step 440 indicates the CPN is a customer of the system associated with the SCP, so the SCP queries its external database as shown in step 460 of FIG. 5. At step 470, if the external database (EDB) does not have an ANI II entry, the SCP checks at step 480 as to whether the provider has a BSP/VM option. If the provider does have this option, the SCP processes the call as shown in FIG. 9. If such option exists, the SCP sets the ANI II to 49, and jumps to step 590. Steps 500-540 check to see whether the calling party has elected to block CPP/PPP calls from their number. The ANI II (or CPST) values are typically two digit numbers and therefore less than or equal to 99. The ANI IIs stored in the EDB are modified by adding a preceding digit in the event a calling party has indicated they wish to block the CPP/PPP services. A prefix of '1' indicates the calling party wishes to block cellular calling party pays, a prefix of '3' indicates blocking of paging party pays is desired, and a prefix of '2' indicates that both should be blocked. As shown, step 510 checks the CPN ANI II for a prefix of '1' or '2', which is the test for a call made to a cellular provider NPA-NXX.

Figure 8:
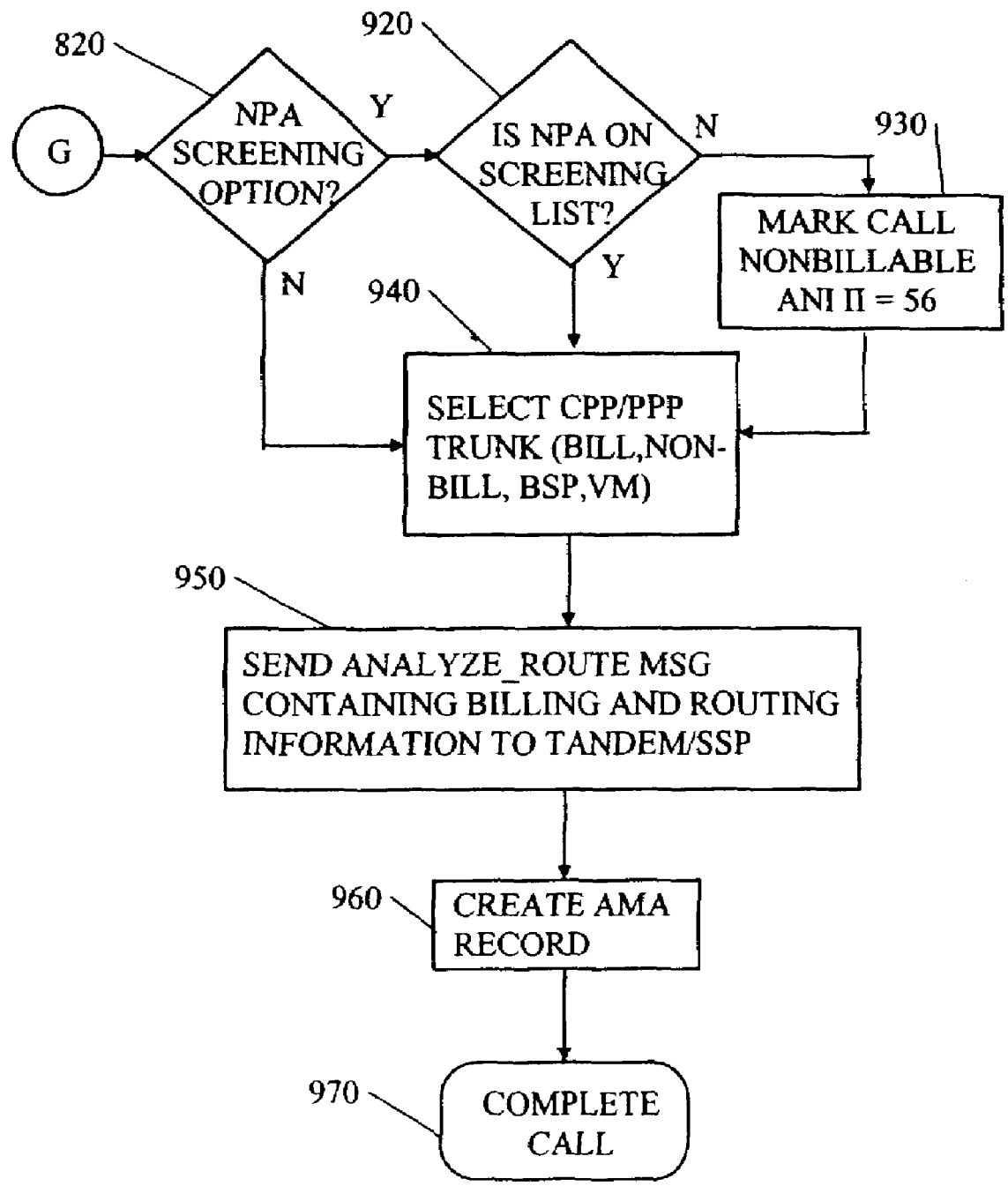

If at step 550 the SCP determines that the ANI II is not billable, or if the ANI II was unavailable as determined in step 430, the SCP checks to see if the provider has a BSP/VM option at step 560. If so, the call is processed as depicted in FIG. 9. If not, the call is marked as non-billable at step 570. The SCP then determines at step 580 if the provider nevertheless wishes to play an announcement regarding CPP/PPP. This is referred to herein as Play Announcement Option 2. The call is then processed according to FIG. 6. Otherwise, the call is processed as shown in FIG. 8, which routes the call without playing any announcements.

If the ANI II indicates the call's CPN is billable, billing is set to yes in step 590, and at step 600 the SCP determines whether the Play Announcement Option 1 is selected. Option 1 at step 600 is preferably always selected, otherwise, a calling party would be billed without any notification. Standard worded announcements for billable parties are pre-loaded in targeted tandem offices. The wording for these announcements is preferably:

Cellular Providers:
"Welcome to (provider's name). At the request of the cellular phone customer you are calling, charges of XX cents per minute to complete this call will be added to your phone bill. To continue, press one now. To avoid charges, hang up now. If you are calling from a rotary phone, please hold. Your call will be completed shortly. Normal usage rates apply."

Paging Providers:
"Welcome to (provider's name). At the request of the customer you are calling, a charge of XX cents will be made to your phone bill. To complete this page, press one now."

The wording may vary slightly based on customer preference and other considerations. Separate announcements are preferably for peak and off peak periods. Customized announcements are recorded, with up to two announcements per cellular provider, one peak announcement, one non-peak announcement and a generic free day announcement. There are preferably three generic price points for the BSP option and consequently, the provider can choose from one of these three announcements for this option. Voicemail and VIP PIN options have generic announcements.

The SCP determines which announcement to play at steps 610, 620 and 630. There are preferably up to three announcements per cellular provider, one for peak hours; one for off-peak hours, and one for a free period. Based on the announcement option selected, the SCP will send a Send_to_Resource TCAP message directing the tandem/SSP to play the appropriate announcement and to collect digits. The announcement informing the calling party that they will be billed for the call if they continue requires caller interaction: the entering of a '1'. The Send_to_Resource message contains at least the following parameters: ResourceType, AnswerIndicator, and StrParameterBlock. The StrParameterBlock includes an announcement ID indicating the appropriate announcement as follows:

| Announcement ID | Announcement Verbiage |
| --- | --- |
| 97 | Please enter digits now |
| 98 | That entry is not valid |
| 99 | The person you are calling subscribes to Calling Party Pays service. To complete this call for a charge of XX cents per minute on your telephone or bank credit card, press one. To avoid charges, hang up now. |
| 100 | The person you are calling subscribes to Calling Party Pays service which cannot be used at the phone you are calling from. To Leave a message for this person, press three and record your message at the tone. |
| 101 | The person you are calling subscribes to Calling Party Pays service. To complete this call for a charge of XX cents per minute on your-telephone or bank credit card, press one. To leave a message for this person, at no charge, press three and record your message at the tone. |
| 102 | That choice is not available. |
| 103 | To complete this call for a charge of XX cents per minute on your telephone or bank credit card, press one. To avoid charges, hang up now. |
| 104 | To leave a message for this person, press three and record your message at the tone. |
| 105 | To complete this call for a charge of XX cents per minute on your telephone or bank credit card, press one. To leave a message for this person, at no charge, press three and record your message at the tone. |
| 106 | The person your are calling subscribes to Calling Party Pays service. Calling Party Pays has been blocked by the owner of the phone number you are calling from. |

When the calling party enters a '1' or the timer expires, the SSP sends a Resource_Clear message to the SCP containing the parameters ClearCause and CollectedDigits. If the Resource_Clear message indicates that the announcement is unavailable, as shown in 870, then the record is marked as non-billable in step 880.

Figure 7:
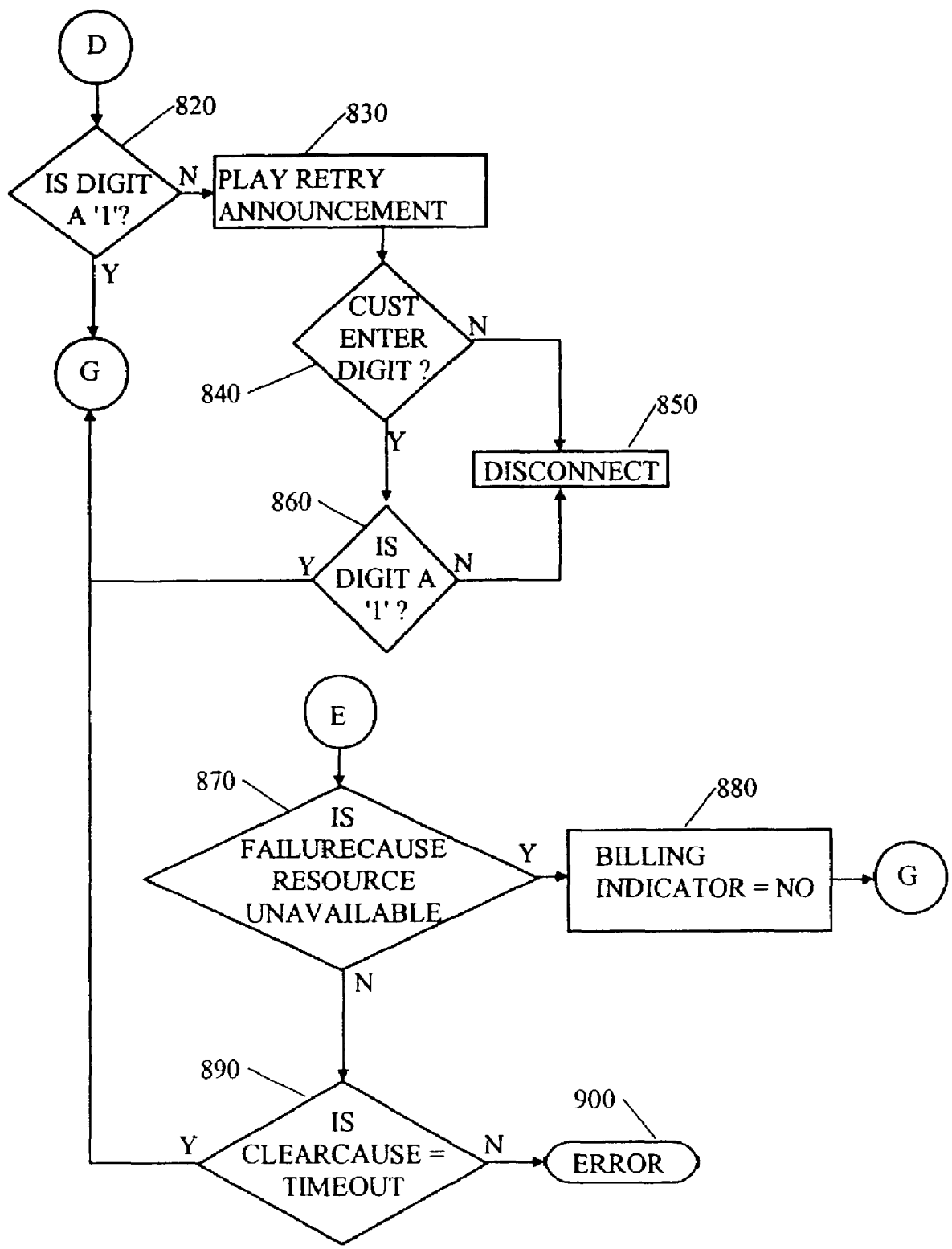

If the provider does not offer a PIN/billing override option as determined at step 640, the SCP determines if the customer entered a single digit at step 650, and if so, the call is processed as shown in FIG. 7. If the caller is using a rotary phone the call is processed via steps 660, 870, 890, and then in accordance with the steps shown in FIG. 8. The customer must hang up if they do not wish to be billed for the call. The call will then be disconnected as shown in step 670. If the caller does not enter a single digit, the process follows steps 660, 870, 890, and 900, resulting in an error condition. The result is termination of the call.

If the provider offers a PIN option, the SCP checks at step 680 to see if the caller has entered a '2', even though the announcement preferably does not indicate this as a valid entry. If a '2' was entered, a tone is played at step 690, and the PIN entry is validated as shown in steps 700 and 710. If valid, the call is processed as shown in steps 720, 730, and then as shown in FIG. 8. In steps 780 and 790, an announcement giving the caller an additional attempt to enter the PIN is played in the event a customer enters an invalid PIN (or other than four digits—see step 700). This announcement is generic and is shared by all cellular providers. If the customer does not enter a valid PIN the second time the call is terminated as shown in steps 750 and 760.

As shown in FIG. 7, if a digit other than '1' is received (step 820), the SCP will respond with another Send_to_Resource message and play a recording (step 830) giving the caller another chance to enter a '1'. This announcement is generic and is shared by all cellular providers. If the customer does not enter a digit, step 840 directs the process to step 850, which disconnects the call. If the Resource_Clear message doesn't contain a '1' the second time, step 860 directs the process to terminate the call at step 850. If the customer does enter a '1', the call is passed to FIG. 8.

The 'play announcement' options available to the customer allow the customer to select whether the announcement is played all of the time or not played if the call is non-billable. Option 1 or 2 or both may be selected. Option 1 indicates a message will be played if the CPN is available and the CPST is billable. As stated above, it is preferably always selected. Option 2 indicates a message will be played even though the CPST is non-billable, regardless of whether the CPN is available.

With reference to FIG. 8, the SCP determines if the NPA screening feature is on. This feature allows certain NPAs to be designated as nonbillable. Steps 910, 920 and 930 perform this function. After the NPA screening is performed, the SCP determines in step 940 the appropriate trunk over which to route the call. This determination is made based on the billing status and the BSP/VM status, in view of the preferences selected by the service provider. At step 950, the SCP sends an Analyze_Route TCAP response to the tandem/SSP. The Analyze_Route message contains at least the following parameters: CallingPartyID, Primary Trunk Group, AMALineNumber and AMAslpID. The route index will be populated on a table based on the originating point code of the call. The tandem then creates the appropriate billing record and routes the call as shown in steps 960 and 970.

With reference to FIG. 9, the SCP determines at step 980 which BSP/VM option is appropriate, and directs the tandem/SSP to play the announcement at step 990. The TCAP Send_to_Resource message and response are also used for BSP, VM or BSP/VM options, as well as the PIN option. The above-mentioned Send_to_Resource and Resource_Clear parameters are used in each case. The announcement wording for CPP with BSP option is preferably:

"The Party you have called has elected Calling Party Pays service. The charges for this call cannot be billed to the number from which you are calling. If you wish to bill this to a credit card, press '1', to leave a voicemail for this customer press '3'."

For providers only having one of the options, the preferred announcements are as follows: for BSP option only:

"The Party you have called has elected Calling Party Pays service. The charges for this call cannot be billed to the number from which you are calling. If you wish to bill this to a credit card, press '1'."

For Voicemail Option Only:

"The Party you have called has elected Calling Party Pays service. The charges for this call cannot be billed to the number from which you are calling, to leave a voicemail for this customer press '3'."

If the caller has hung up, the call is disconnected as indicated in steps 1000 and 1010. Otherwise, the call is processed according to steps 1020, 1030 and 1040 if the caller has indicated a voice mail option, and the call is processed as described above with reference to FIG. 8. The call is processed according to steps 1020, 1050, 1060, and 1070 for routing in accordance with FIG. 8. The ANI II is set to '53' so that when the AMA record is generated at step 960, it will be clear that the call had been routed to the BSP. Recall that step 330 determines if the call is from a BSP, and if so, the call is simply routed, and no AMA record is generated at that time. Similarly, calls sent to voicemail should be coded as nonbillable, and the ANI II is set to '54' as shown in step 1030.

If the caller enters a digit other than 1 or 3, the entry is checked to see if it is a 2 at step 1080, and if so, is routed to the PIN processing section at step 680. If the entry is not a 2, the caller is given a second chance by replaying the message at step 990 after incrementing the try counter at step 1100. If the caller has already had a second chance, the call is processed via steps 1090, 1110, and is disconnected at step 1120.

Calls to the Billing Service Provider (BSP) will be sent with Feature Group C with the following format KP+I+10 digits (called number)+ST. The BSP will return the following over Feature Group D trunk: KP+II+ANI+ST; KP+10 digits+ST.

A preferred embodiment of the present invention has been described herein. It is to be understood, of course, that changes and modifications may be made in the embodiment without departing from the true scope of the present invention, as defined by the appended claims.

What is claimed is:

1. A system for processing a calling party pays call initiated by a first subscriber device to a second subscriber device, the system comprising:
   a processor;
   a switch operative to transmit, to the processor, an automatic number identifier (ANI) of the first subscriber device comprising a calling number and a called number; and
   a database comprising a field comprising the billing preferences of the second subscriber device;
   wherein the processor is operative to determine that a billing status of the first subscriber device is nonbillable based on a charge party station type (CPST) of the first subscriber device and, in response to that determination, perform at least one of the following: route the call to a voice mail provider or route the call to a billing service provider; and
   wherein the processor is further operative to determine that the billing preference of the second subscriber is calling party pays and the processor determines that the billing preferences of the second subscriber is calling party pays by examining the field in the database.

2. The system of claim 1 further comprising a database comprising a field comprising the CPST of the first subscriber device, and wherein the processor is further operative to determine that the billing status of the first subscriber device is nonbillable by examining the field in the database.

3. The system claim 1, wherein the processor comprises a service control point.

4. The system of claim 1, wherein the switch comprises a tandem switch.

5. The system of claim 1, wherein the switch is operative to transmit the ANI of the first subscriber device to the processor using a TCAP route the call to a voice mail provider, and wherein the switch is further operative component of a signaling system 7 protocl.

6. The system of claim 1, wherein the processor is operative to route the call to a voice mail provider, and wherein the switch is further operative to play a message to the first subscriber device indicating that voice mail is an option.

7. The system of claim 1, wherein the processor is operative to route the call to a voice mail provider, and wherein the switch is further operative to play a message to the first subscriber device indicating that no additional charges are associated with the voice mail option.

8. The system of claim 1, wherein the processor is operative to both route the call to the voice mail provider and to route the call to the billing service provider, and wherein the switch is further operative to prompt the first subscriber device to choose whether the processor should route the call to the voice mail provider or route the call to the billing service provider.

9. The system of claim 1, wherein the first subscriber device is associated with a calling party, and wherein the processor is further operative to route the call to the second subscriber device without charging additional fees to the calling party in response to receiving a calling party pays override code from the calling party.

10. A method of processing a call initiated by a first subscriber device to a second subscriber device, the method comprising:
   receiving an automatic number identifier (ANI) of the first subscriber device comprising a calling number and a called number
   determining a billing status of the first subscriber device based on a charge party station type (CPST) of the first subscriber device;
   determining billing preferences of the second subscriber device in response to the received called number, the billing preferences being calling party pays;
   receiving and verifying a calling party pays override code from a calling party associated with the first subscriber device; and
   in response to receiving and verifying the calling party pays override code, routing the call to the second subscriber device without charging additional fees to the calling party, even if the billing status is determined to be billable.

11. The method of claim 10, wherein the second subscriber device is associated with a called subscriber, and wherein the method further comprises creating a billing record indicating the call is to be billed to the called subscriber.

12. The method of claim 10, further comprising playing a message indicating a PIN should be entered.

13. The method of claim 10, wherein a service control point determines the billing status and the billing preferences.

14. The method of claim 10, wherein the ANI is received via a TCAP component of a signaling system 7 protocol.

15. A method of processing a call initiated by a first subscriber device to a second subscriber device, the method comprising:
   receiving an automatic number identifier (ANI) of the first subscriber device comprising a calling number and a called number;
   determining a billing status of the first subscriber device based on a charge party station type (CPST) of the first subscriber device;
   determining billing preferences of the second subscriber device in response to the received called number, the billing preferences being calling party pays; and
   terminating the call if the CPST indicates that calling party pays billing is blocked from the calling number.

16. The method of claim 15, wherein terminating the call further comprises:
   playing a message indicating that calling party pays is blocked; and
   disconnecting the call.

17. The method of claim 15, wherein a service control point determines the billing status and the billing preferences.

18. The method of claim 15, wherein the ANI is received via a TCAP component of a signaling system 7 protocol.

* * * * *